(12) United States Patent
Barillot et al.

(10) Patent No.: US 10,974,594 B2
(45) Date of Patent: Apr. 13, 2021

(54) ASSEMBLY FOR A DIFFERENTIAL UNIT OF A VEHICLE

(71) Applicant: Volvo Truck Corporation, Gothenburg (SE)

(72) Inventors: Thomas Barillot, Mornant (FR); Serge Vananty, Chassieu (FR); Yann Depoorter, Lyons (FR); Chris Clezardin, Saint Maurice sur Dargoire (FR); Michael Joliet, Montseveroux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/467,031

(22) PCT Filed: Dec. 7, 2016

(86) PCT No.: PCT/IB2016/001913
§ 371 (c)(1),
(2) Date: Jun. 5, 2019

(87) PCT Pub. No.: WO2018/104760
PCT Pub. Date: Jun. 14, 2018

(65) Prior Publication Data
US 2019/0322170 A1 Oct. 24, 2019

(51) Int. Cl.
*F16H 48/38* (2012.01)
*B60K 17/16* (2006.01)
(Continued)

(52) U.S. Cl.
CPC ........... *B60K 17/165* (2013.01); *F16H 48/38* (2013.01); *F16H 57/021* (2013.01); *B60B 35/16* (2013.01); *F16H 2048/382* (2013.01)

(58) Field of Classification Search
CPC ........ F16H 57/037; F16H 48/08; B60B 35/16
See application file for complete search history.

(56) References Cited

U.S. PATENT DOCUMENTS

| | | | | |
|---|---|---|---|---|
| 1,794,203 A | * | 2/1931 | Repeck | F16H 57/037 475/246 |
| 1,944,612 A | * | 1/1934 | Repeck | F16H 57/023 475/246 |

(Continued)

FOREIGN PATENT DOCUMENTS

| | | |
|---|---|---|
| DE | 3737421 A1 | 5/1988 |
| DE | 19544588 A1 | 6/1997 |

(Continued)

OTHER PUBLICATIONS

International Search Report and Written Opinion for International Patent Application No. PCT/IB2016/001913, dated Oct. 23, 2017, 11 pages.

*Primary Examiner* — Sherry L Estremsky
(74) *Attorney, Agent, or Firm* — Withrow & Terranova PLLC (57) ABSTRACT

The invention relates to an assembly for a differential unit of a vehicle, the assembly comprising: —a first housing portion (20a) designed to be assembled with a second housing portion for forming a differential carrier housing; —a first and a second supporting devices (30, 301, 302), each comprising a main portion (33) having substantially the shape of a ring and a base portion (31) attached to the first housing portion (20a) so that the main portions (33) of the first and second supporting devices (30) are substantially coaxial along a longitudinal direction (X), the first and second supporting devices being configured to support, in use, a system comprising a crown wheel (22) and a differential housing (24) containing a differential, the system having two end portions each including a bearing which has an inner (Continued)

ring (51) mounted on the differential housing (24), an outer ring configured to be mounted in the main portion (33) of one of the supporting devices (30), and rolling elements. The first housing portion (20*a*), the first supporting device (301) and the second supporting device (302) are made as a single piece. Moreover, the main portion (33) of at least one supporting device (30) comprises a notch (40) for inserting at least part of a corresponding end portion of the system (100), the notch (40) opening: —in a radial direction (Y), which is orthogonal to the longitudinal direction (X); —and in the longitudinal direction (X), towards the opposite supporting device (30).

15 Claims, 6 Drawing Sheets

(51) Int. Cl.
    *F16H 57/021*     (2012.01)
    *B60B 35/16*     (2006.01)

(56) References Cited

U.S. PATENT DOCUMENTS

| | | | | |
|---|---|---|---|---|
| 2,651,216 A | * | 9/1953 | Alden | F16H 48/08 475/247 |
| 3,198,036 A | | 8/1965 | Muller | |
| 3,974,717 A | * | 8/1976 | Breed | F16H 48/08 475/86 |
| 4,227,427 A | * | 10/1980 | Dick | F16C 19/548 184/6.12 |
| 4,793,211 A | * | 12/1988 | Schmidt | F16C 19/548 475/246 |
| 4,821,602 A | | 4/1989 | Yasui et al. | |

FOREIGN PATENT DOCUMENTS

| | | | | |
|---|---|---|---|---|
| DE | 102013016838 A1 | * | 7/2014 | F16H 57/037 |
| EP | 1527936 A1 | | 5/2005 | |
| GB | 2391915 A | | 2/2004 | |

* cited by examiner

ASSEMBLY FOR A DIFFERENTIAL UNIT OF A VEHICLE

This application is a 35 USC 371 national phase filing of International Application No. PCT/IB2016/001913, filed Dec. 7, 2016, the disclosure of which is incorporated herein by reference in its entirety.

TECHNICAL FIELD

The invention relates to an assembly for a differential unit of a vehicle. The invention also relates to a differential unit comprising such an assembly, to an axle comprising such a differential unit, to a vehicle comprising such an axle, and to a method for mounting a differential unit.

The invention can be applied in heavy-duty vehicles, such as trucks, buses and construction equipment.

BACKGROUND

A vehicle such as a truck is generally equipped with one or several differential units on its driven axles.

A differential unit typically comprises a differential carrier housing which is made of a first housing portion assembled with a second housing portion, and which contains the differential mechanism, i.e.: a crown wheel driven by an input shaft, a differential arranged inside the crown wheel and comprising pinions and gears, and a differential housing containing the differential and part of drive shafts connected to a wheel of the vehicle.

The differential housing is rotatably mounted in the differential carrier housing. To that end, the first housing portion comprises a first and a second supporting devices each comprising a main portion having substantially the shape of a ring, for receiving a bearing mounted around the differential housing surrounding the drive shaft.

According to a known implementation, a supporting device is made of a first half ring which is made as a single piece with the first housing portion, and a second half ring which is manufactured as a separate piece and subsequently secured to the first half ring.

This implementation has several drawbacks. In particular, it requires manufacturing and assembling several parts, which is unfavourable in terms of time and cost. Besides, the half rings needs to be paired after they have been machined together in the assembled position, to ensure proper operation of the differential unit. Moreover, having a supporting device made of two separate parts may lead to the ring being less resistance to mechanical fatigue and becoming oval over time, which would result in a malfunctioning of the differential unit.

According to another known implementation, the supporting devices are made of as a single piece with the first housing portion. With such an implementation, mounting the differential mechanism between the supporting devices with the end portions of the differential housing engaged in the supporting devices is fairly complicated. Indeed, this requires to first engage one end portion of the differential housing in one supporting device, with the differential mechanism being arranged obliquely, and then to move the differential mechanism towards a straight position in order to engage the other end portion of the differential housing in the other supporting device. In other words, the mounting process requires a combination of successive movements of the differential mechanism, which are not easy to perform, all the more as the differential mechanism can be heavy. Thus, this implementation proves difficult to mount by an operator. Another drawback of this implementation is that the successive movements of the differential mechanism require a great space to be performed, resulting in a differential unit having a large size.

SUMMARY

An object of the invention is to provide an improved differential unit for a vehicle.

More specifically, an object of the invention is to provide a differential unit for a vehicle which is advantageous as compared to the prior art in terms of manufacturing process, durability and mounting process.

To that end, and according to a first aspect, the invention concerns an assembly for a differential unit of a vehicle, the assembly comprising:

a first housing portion designed to be assembled with a second housing portion for forming a differential carrier housing;

a first and a second supporting devices, each comprising a main portion having substantially the shape of a ring and a base portion attached to the first housing portion so that the main portions of the first and second supporting devices are substantially coaxial along a longitudinal direction, the first and second supporting devices being configured to support, in use, a system comprising a crown wheel and a differential housing containing a differential, the system having two end portions each including a bearing which has an inner ring arranged around the differential housing, an outer ring configured to be mounted in the main portion of one of the supporting devices, and rolling elements;

wherein the first housing portion, the first supporting device and the second supporting device are made as a single piece, and in that the main portion of at least one supporting device comprises a notch for inserting at least part of a corresponding end portion of the system, the notch opening:

in a radial direction, which is orthogonal to the longitudinal direction; and in the longitudinal direction, towards the opposite supporting device.

More specifically said notch forms a through hole in the radial direction and preferably a non-through hole in the longitudinal direction.

Said inner ring arranged around the differential housing can be a ring mounted on the differential housing. Alternatively, said inner ring can be integral with the differential housing. In other words, in the latter case, each inner ring can be made as a single piece with a differential housing part.

Preferably, each supporting device comprises a notch for inserting at least part of the corresponding end portions of the system and the notches are substantially facing each other along the longitudinal direction.

In the longitudinal direction said notch forms a non-through hole and comprises therefore according to the longitudinal direction a bottom. If both supporting devices comprise a notch for inserting at least part of the end portions of the system, the bottoms of the notches are preferably separated from each other by a distance, according to the longitudinal direction, that is greater than the length of the system between its two end portions.

If only one supporting device comprises a notch for inserting at least part of the corresponding end portion of the system, the bottom of said notch is separated from the other supporting device by a distance, according to the longitudinal direction, that is greater than the length of the system between its two end portions.

Because the first housing portion, the first supporting device and the second supporting device are made as a single piece, the invention provides an assembly which has numerous advantages: by reducing the number of constituting parts to only one, the assembly is less expensive to manufacture and the logistics is simplified; insofar as no assembling step is to be performed, costs are further reduced, there is no need to provide fasteners to assemble the various constituting parts, and no parts pairing is required; the overall stiffness is increased as compared to an assembly made of separate parts secured the ones to the others, which is of particular interest for the bevel set gears contact and improves durability.

Moreover, owing to said one or both notches, such a "one-piece" configuration does not complicate the mounting process. Indeed, if each supporting device comprises a notch for inserting at least part of the corresponding end portions of the system, mounting the system on the assembly requires only a translation movement of the system towards the supporting devices, along the above-mentioned radial direction. If only one supporting device comprises a notch, mounting the system on the assembly requires a first translation movement of the system towards the supporting devices, along the above-mentioned radial direction and may require a further second translation movement along the longitudinal direction. This simple movement or sequence of two movements can be easily performed by an operator. It can be envisaged that, during the mounting operations, the only one movement or the first movement is a downward translation, which is even easier to perform. Furthermore, no specific space is required to perform this movement and, consequently, the differential unit can be fairly compact.

Said notch can be arranged on said at least one supporting device substantially opposite the base portion with respect to the longitudinal axis. Then, mounting the system on the assembly can be therefore performed by only one translation movement of the system in the transverse direction, i.e. towards the first housing portion. If only one notch is provided, this first translation movement is preferably followed by a second translation movement along the longitudinal direction. This makes the assembly easier because a large access is provided to the assembly.

According to an implementation, said at least one notch is dimensioned to allow mounting the system when it is devoid of the bearing outer rings—and preferably also devoid of the rolling elements and possible cage receiving said rolling elements—and the assembly is configured to prevent movement of the whole system—i.e. the system including the bearings in their entirety, including the outer rings—out of said notch once the system has been mounted in the supporting devices. For example, said or each notch can form an opening in the ring-shaped main portion of the supporting device, the width of said opening being greater than the outer diameter of the bearing inner ring.

Alternatively, said at least one notch could be dimensioned to allow inserting the whole system, with an additional mean being provided for subsequently prevent the whole system from moving out of said notch.

Said at least one notch can further be dimensioned to prevent movement of the whole system out of said notch. With this implementation, the outer ring of the bearing forms a means for at least partially closing the notch. For example, the notch or each notch forms an opening in the ring-shaped main portion of the supporting device, the width of said opening being less than the outer diameter of the bearing outer ring.

Alternatively or in addition, the assembly may further comprise at least one cover which can be assembled to one supporting device in order to at least partially close said at least one notch so as to prevent movement of the whole system out of said at least one notch once the system has been mounted in the supporting devices.

According to a second aspect, the invention concerns a differential unit comprising an assembly as previously described and, mounted on said assembly:
  a differential comprising differential side pinions fitted on a joint cross of the differential and two differential side gears each connected to at least one differential side pinion and to a drive shaft capable of being connected to at least one wheel of a vehicle, outside the differential carrier housing;
  a differential housing containing the differential and a part of the drive shafts,
  a crown wheel having a longitudinal axis, the crown wheel being arranged to be driven in rotation around said longitudinal axis by an input shaft, the crown wheel being connected to the joint cross of the differential in a rotationally fixed manner, the crown wheel being secured to the differential housing and the crown wheel being arranged substantially around the differential housing;
  on both sides of the crown wheel, a bearing having an inner ring arranged around the differential housing, rolling elements, and an outer ring mounted in the ring-shaped main portion of the corresponding supporting device.

In an implementation, the or each notch defines an opening in the ring-shaped main portion of the corresponding supporting device, the width of said opening being greater than the outer diameter of the bearing inner ring. Therefore, the or each notch allows mounting the system when the inner rings are present.

For example, the or each notch can define an opening in the ring-shaped main portion of the corresponding supporting device, the width of said opening being less than the outer diameter of the bearing outer ring. Then, the or each notch allows mounting the system only when the outer rings are not present, and prevent the system including the outer rings from moving out of the or each notch, i.e. out of the supporting devices, once it is mounted on the assembly.

With this implementation, the outer ring of the bearing forms a means for at least partially closing the notch. Alternatively, for example if each or the notch is larger, it may be provided a separate cover to close the notch and thus lock the system in the mounted position.

According to a third aspect, the invention relates to an axle comprising a differential unit as previously described, the axle comprising an axle housing which forms the second housing portion designed to be assembled to the first housing portion and which contains the drive shafts, the axle further comprising a wheel connected to one end of each drive shaft.

According to a fourth aspect, the invention relates to a vehicle comprising at least one axle as previously described.

According to a fifth aspect, the invention relates to a method for mounting a differential unit, the method comprising:
  a) providing an assembly as previously described;
  b) providing a system comprising a crown wheel and a differential housing containing a differential, the system having two end portions each including a bearing which has an inner ring arranged around the differential housing, an outer ring, and rolling elements;

c) inserting at least part of at least one end portion of the system through at least one notch of the first and/or second supporting devices, along said radial direction, in order to mount the system on the assembly.

In other words, the system is mounted between the supporting devices, with the end portions of the differential housing engaged in the supporting devices, by at least one translation movement of the system along the radial direction defined by said at least one notch.

Preferably in step a) of the method each supporting device comprises a notch for inserting at least part of the corresponding end portions of the system and the notches are substantially facing each other along the longitudinal direction; and in step c) of the method at least part of each end portion of the system is inserted through the notch of each of the first and second supporting devices, along said radial direction, in order to mount the system on the assembly.

In other words, the system is mounted between the supporting devices, with the end portions of the differential housing engaged in the supporting devices, by a translation movement of the system along the radial direction defined by the two notches of both supporting devices, which is a movement easy to perform.

In an implementation, the method comprises mounting the system devoid of the bearing outer rings on the assembly, and preferably further devoid of rolling elements and cage.

Then, once the system devoid of the bearing outer rings is mounted on the assembly, the method can comprise inserting each bearing outer ring around the corresponding bearing inner ring and inside the ring-shaped main portion of the corresponding supporting device, along the longitudinal direction, towards the opposite supporting device.

The method may further comprise closing said notch, after step c). The notch can be closed by a separate cover assembled to the supporting device, or by the outer ring of the bearing.

Once the system is mounted on the assembly, the method may comprise assembling a nut on each end portion of the system, generally along the longitudinal direction and towards the opposite supporting device, the nut having an outer thread for cooperating with an inner thread of the ring-shaped main portion of each supporting device, and a central hole for engagement around the differential housing. Such a nut can typically be used to axially press the outer ring of the corresponding bearing.

Once the nuts are mounted, the method may comprise inserting an end portion of a drive shaft in the differential housing, along the longitudinal direction and towards the opposite supporting device. In practice, a drive shaft is inserted in the differential housing on both sides of the crown wheel.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
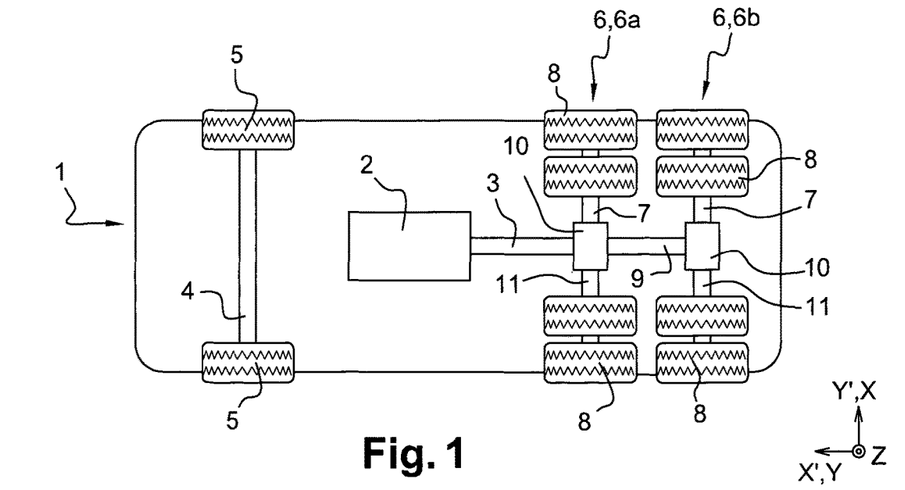
FIG. 1 is a schematic drawing of an underside of a vehicle showing a rear axle including a differential unit according to an embodiment of the invention.

As shown in FIG. 1, a vehicle 1 comprises an engine 2 that drives an input shaft 3 having an axis 13, and a front axle 4 connected to front wheels 5.

The vehicle 1 also comprises at least one rear axle 6. The or each rear axle 6 comprises an axle housing 7 containing a differential unit 10, which includes a differential 15, and two drive shafts 11. Each drive shaft 11 has a first end connected to the differential 15 and a second end connected to at least one wheel 8. In the illustrated embodiment, the vehicle 1 comprises a first driven rear axle 6a and a second driven rear axle 6b located rearwards from the first driven rear axle 6a, each rear axle 6a, 6b comprising two wheels 8 on either side. An additional shaft 9 connects the input shaft 3 to the differential unit 10 of the second driven rear axle 6b, through the differential unit 10 of the first driven rear axle 6a, and is the input shaft for the differential unit 10 of the second driven rear axle 6b.

Figure 2:
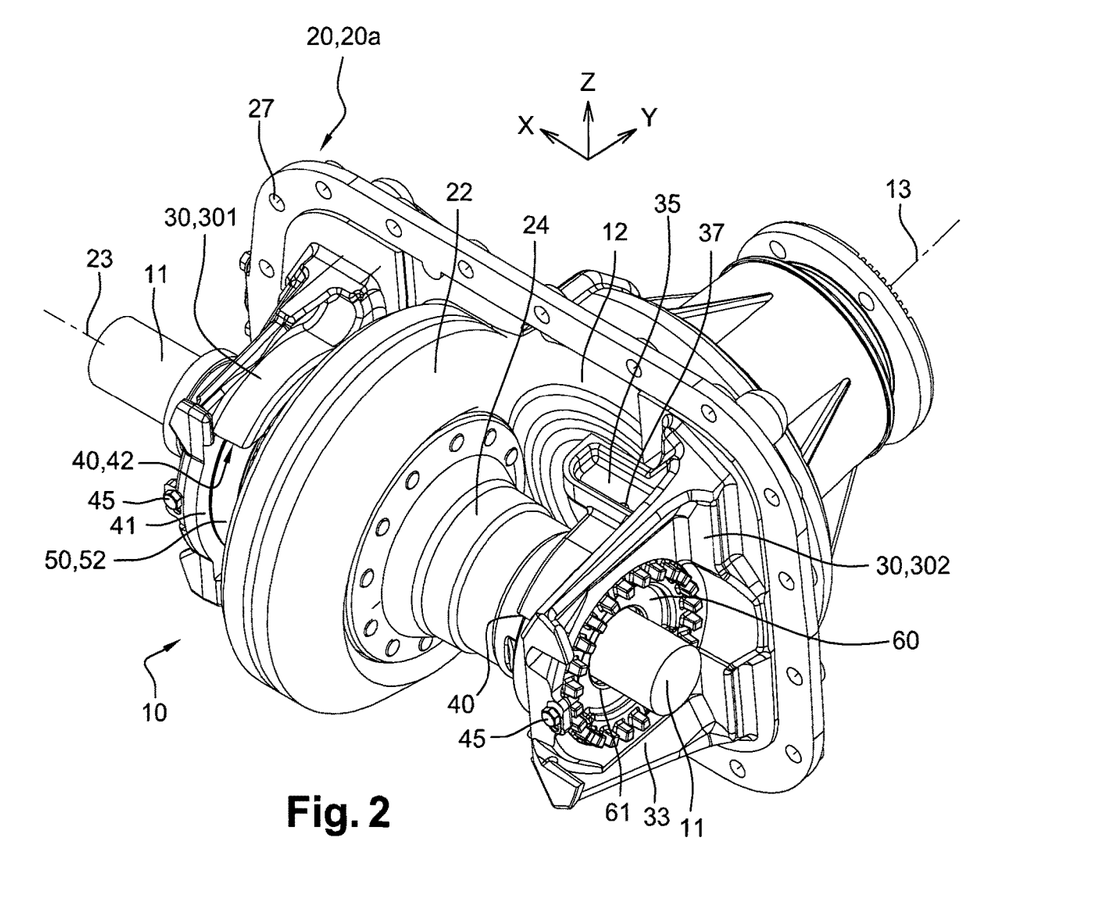
FIG. 2 is a perspective view of the differential unit, with part of the differential carrier housing being removed.
Figure 3:
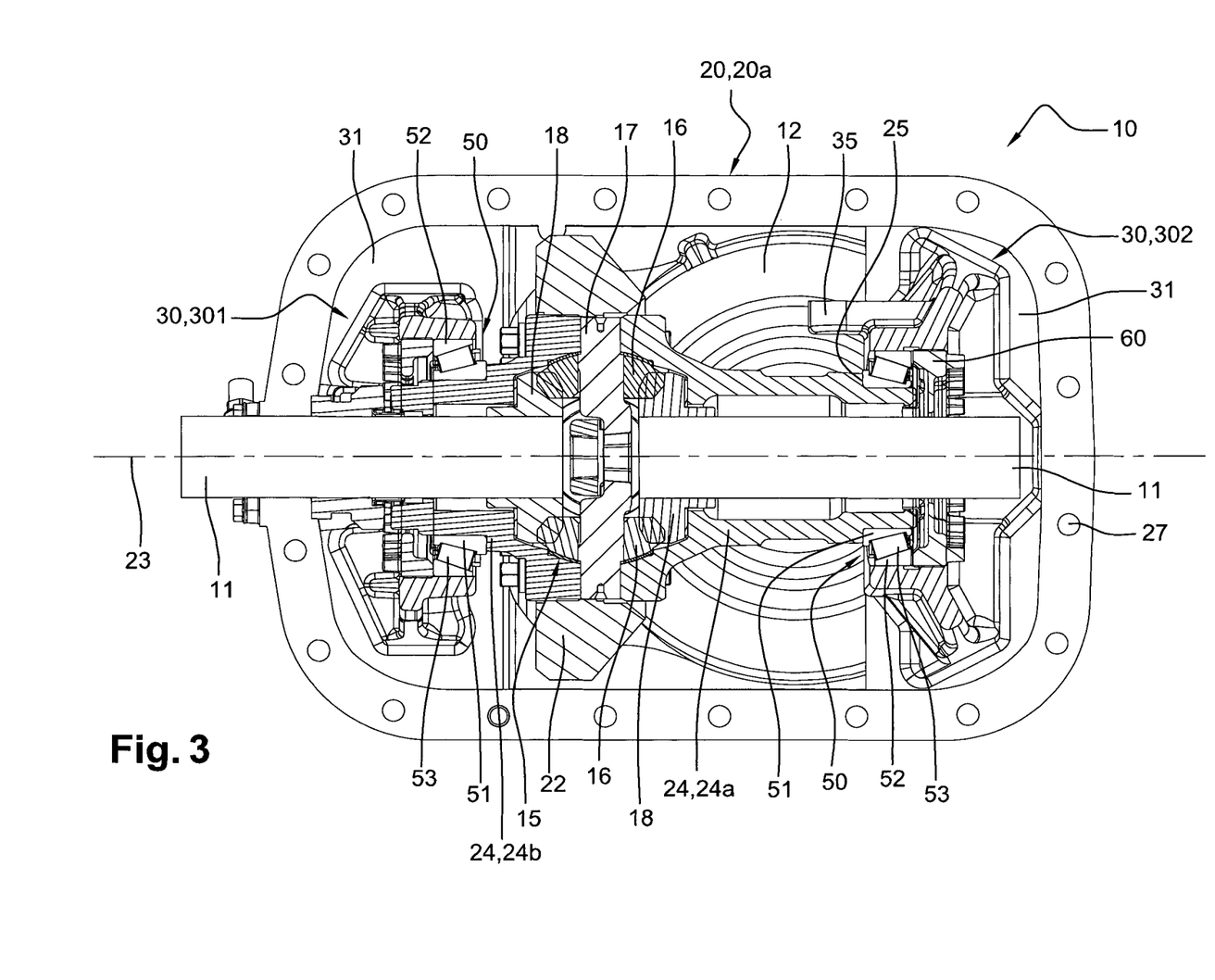
FIG. 3 is a view of the differential unit of FIG. 2, cut in a plane which is substantially vertical and which includes a longitudinal axis of the differential unit.

With reference to FIGS. 2 and 3, the differential unit 10 comprises a differential carrier housing 20.

The differential carrier housing 20 is made of a first housing portion 20a shown in FIGS. 2 and 3, and a second housing portion which can be formed by the axle housing 7, the first and second housing portions being secured to one another by means of appropriate fasteners (not shown). For example, the housing portions can substantially form half shells secured along their peripheral edge by bolts inserted in holes 27. Except in FIG. 1, only the first housing portion 20a of the differential carrier housing 20 has been illustrated, so that the inside of said differential carrier housing 20 can be seen.

Inside the differential carrier housing 20 is located a crown wheel 22 having a longitudinal axis 23. The crown wheel 22 is driven in rotation around said longitudinal axis 23 by the input shaft 3, by engagement of teeth arranged on a pinion 12 mounted on said input shaft 3 and teeth arranged on the crown wheel 22 (the teeth are not illustrated).

As shown in FIG. 2, the longitudinal direction X is defined as a direction parallel to the longitudinal axis 23 of the crown wheel 22. In the operating position, i.e. when the differential unit is mounted under the vehicle 1, as shown in FIG. 1, the longitudinal direction X corresponds the transverse direction Y' of the vehicle 1, i.e. the direction of the axles 4, 6. Direction X is substantially horizontal when the vehicle 1 is on a horizontal surface.

Besides, the transverse direction Y is defined as the direction which is orthogonal to the longitudinal direction X and substantially horizontal when the vehicle 1 is on a horizontal surface. Direction Y corresponds the longitudinal direction X' of the vehicle 1. The axis 13 of the input shaft 3 is parallel to the transverse direction Y, i.e the longitudinal direction X' of the vehicle 1.

Moreover, direction Z is defined as the vertical direction—when the vehicle 1 is on a horizontal surface.

The invention will be described when the vehicle 1 is on a horizontal surface.

Inside the crown wheel 22 is arranged a differential 15 which comprises differential side pinions 16, for example four differential side pinions, which are fitted on a joint cross 17 connected to the crown wheel 22, and two differential side gears 18. Each differential side gear 18 meshes with at least one differential side pinion 16 and is fastened to a first end of one of the drive shafts 11.

The differential unit 10 further comprises, inside the differential carrier housing 20, a differential housing 24 which contains the differential 15 and part of the drive shafts 11, namely the part of each drive shaft 11 which is located near the first end of said drive shaft 11. The crown wheel 22 is secured to the differential housing 24. The differential housing 24 may be made of two parts 24a, 24b each forming a sleeve around the corresponding drive shaft 11, said parts 24a, 24b can be, for instance, fastened on both sides of the crown wheel 22.

The crown wheel 22, differential 15, and differential housing 24 are rotating parts inside and with respect to the differential carrier housing 20. They are mounted on the inner side of the differential carrier housing 20 by means of two supporting devices 30. Each supporting device 30 is attached to the first housing portion 20a and carries a bearing 50 having an inner ring 51 that is mounted on the differential housing 24, 24a, 24b and an outer ring 52 mounted on the supporting device 30. Each bearing 50 further comprises rolling elements 53 arranged in a cage 54 (see FIG. 9 for example). The supporting devices 30 are located on both sides of the crown wheel 22. The bearings 50 are preferably conical bearings. Alternatively, said inner ring 51 can be integral with the differential housing 24, 24a, 24b, in other words each inner ring 51 can alternatively be made as a single piece with a differential housing part 24a or 24b.

The supporting devices 30 are located on both sides of the crown wheel 22. More precisely, there is provided a first supporting device 301 and a second support device 302, the second support device 302 being located on the same side of the crown wheel 22 as the input shaft 3.

Each supporting device 30 comprises a main portion 33 which is substantially in the shape of a ring, and a base portion 31 attached to the first housing portion 20a so that the main portions 33 of the first and second supporting devices are substantially coaxial along the longitudinal axis 23, i.e. along the longitudinal direction X. The base portion 31 can have the shape of a substantially rectangular plate. One or several reinforcing walls may be provided on a supporting device 30, for example between the ring-shaped main portion 33 and the base 31. Each main portion 33 forms a circular opening 34 in which is mounted the outer ring 52 of the bearing 50.

Figure 11:
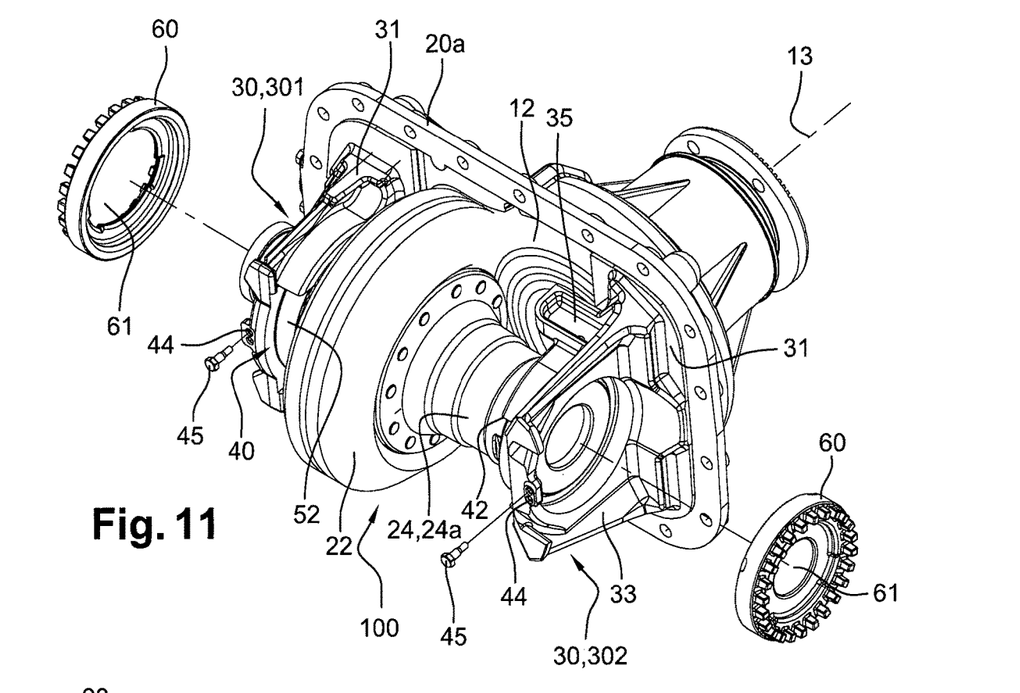
FIGS. 11 and 12 show further subsequent steps of a method for mounting the differential unit according to the invention.

In other words, the supporting devices 30 are configured to support, in use, a system 100 comprising the crown wheel 22, the differential housing 24 containing the differential 15, and the bearings 50 mounted at the end portions of the system (as shown on FIG. 11).

In use, the housing 20 contains a lubricant bath in which the crown wheel 22 soaks. When the crown wheel 22 is rotated, it projects lubricant from the bath inside the housing thanks to its teeth. Part of this projected lubricant directly contacts some constituents and therefore lubricate them. Another part of this projected lubricant can be collected by a collector 35 arranged on one of the supporting devices 30. In the disclosed embodiment, the collector 35 is arranged on the second supporting device 302.

The collector 35 can have a substantially rectangular and planar bottom wall which is substantially horizontal in use, a peripheral wall and an open upper surface. As shown on FIG. 2, the collector 35 can extend in the longitudinal direction X from the main portion 33 of the second supporting device 302, towards the differential 15, in use.

The collector 35 can be offset with respect to the longitudinal axis 23, for example both along the Y axis and the Z axis. More specifically, the collector 35 can be located on the second supporting device 302 near to the base 31, and preferably above the longitudinal axis 23, in order to take advantage of gravity.

The bottom wall of the collector 35 includes a through hole 37. Moreover, specific arrangements can allow the collected lubricant flowing through the hole 37 to be directed to the differential 15, the constituents of which (especially the differential side pinions 16 and differential side gears 18) cannot be reached easily by the projected lubricant.

As can be seen on the figures, the first housing portion 20a and the two supporting devices 30 are made as a single piece. In other words, they are not made of several parts secured to one another. For example, the first housing portion 20a and the two supporting devices 30 are made together by casting of a metal.

Furthermore, the main portion 33 of each supporting device 30 comprises a notch 40 for allowing mounting the system on the assembly comprising the first housing portion 20a and the supporting devices 30. More specifically, the notch 40 allows inserting at least part of the corresponding end portion of the system.

The notches 40 substantially face each other along the longitudinal direction X. They are preferably arranged on the supporting devices 30 opposite the base portion 31.

Each notch 40 opens in a radial direction—which is orthogonal to the longitudinal direction X—on both sides of the main portion, i.e. towards the axis 23 and towards the outside of the main portion 33. In the illustrated embodiment, as the notches 40 are arranged opposite the base portion 31, said radial direction is the transverse direction Y. However, other implementations can be envisaged. Furthermore, each notch 40 opens in the longitudinal direction X towards the opposite supporting device 30.

Figure 4:
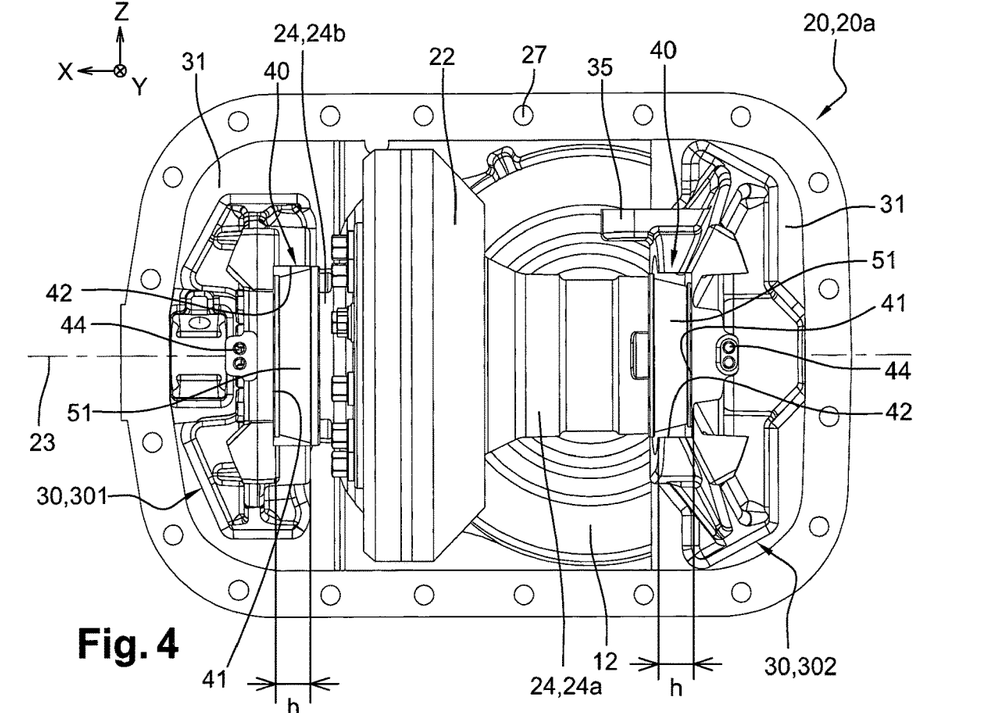
FIG. 4 is a view of the differential unit of FIG. 2 according to an axis which is orthogonal to the vertical axis and to the longitudinal axis of the differential unit, the differential unit not including the bearings outer rings.

As shown on FIGS. 2 and 4, each notch 40 can comprise a bottom face 41 which is substantially parallel to a plane (Y,Z), and two sides faces 42 which are substantially parallel to a plane (X,Y). The distance D between the side faces 42 is the width of each notch 40 of the supporting device 30 (see FIGS. 7, 8 and 10).

Figure 8:
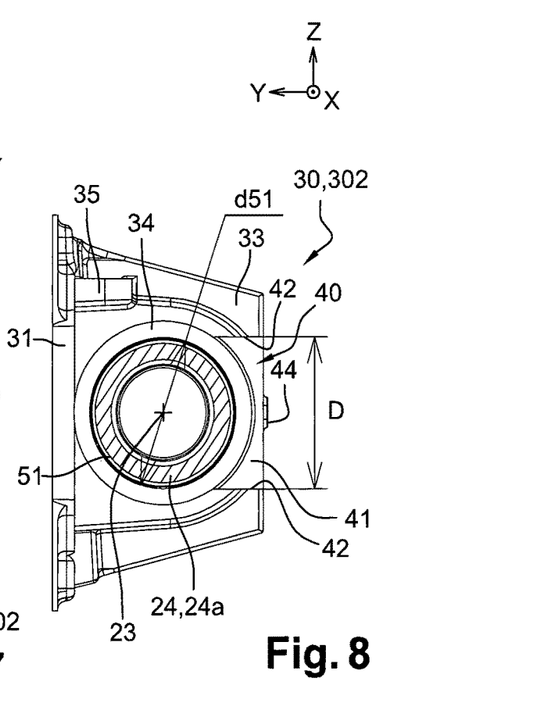
Figure 10:
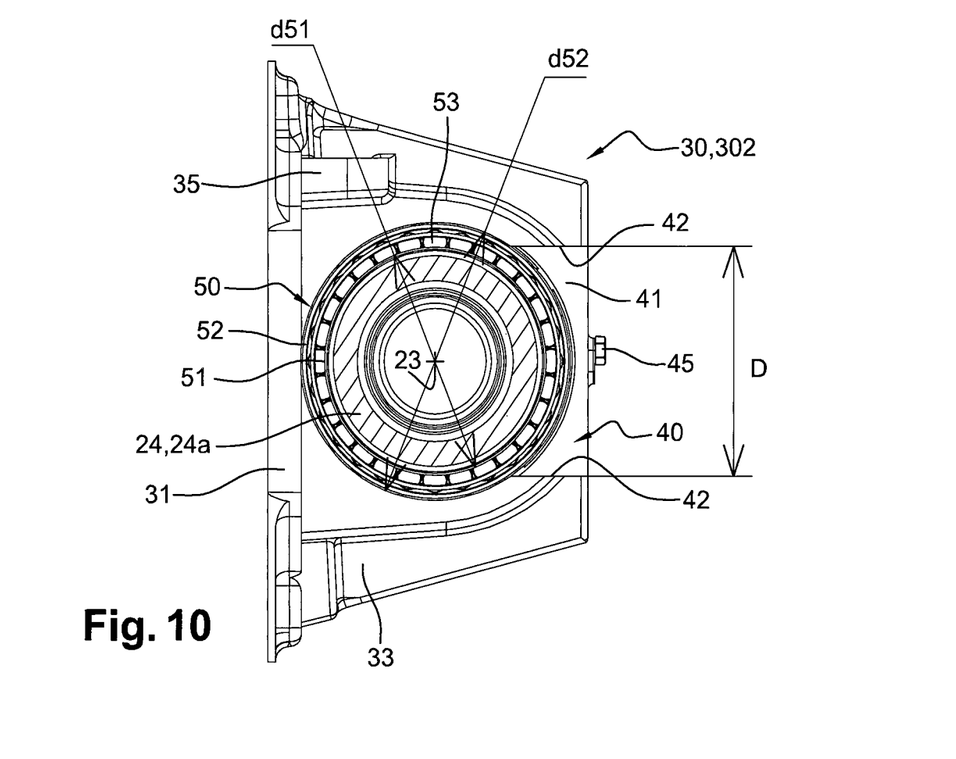
FIG. 10 is a detailed view of part of the differential unit, after the mounting step of FIG. 9.

In an embodiment of the invention, the distance D can be greater than the outer diameter d51 of the bearing inner ring 51, and less than the outer diameter d52 of the bearing outer ring 52 (see FIGS. 8 and 10). In the embodiment illustrated, where the bearing 50 is conical, it is specified that the term "diameter" refers to the higher diameter of the bearing inner ring 51 or outer ring 52.

Figure 6:
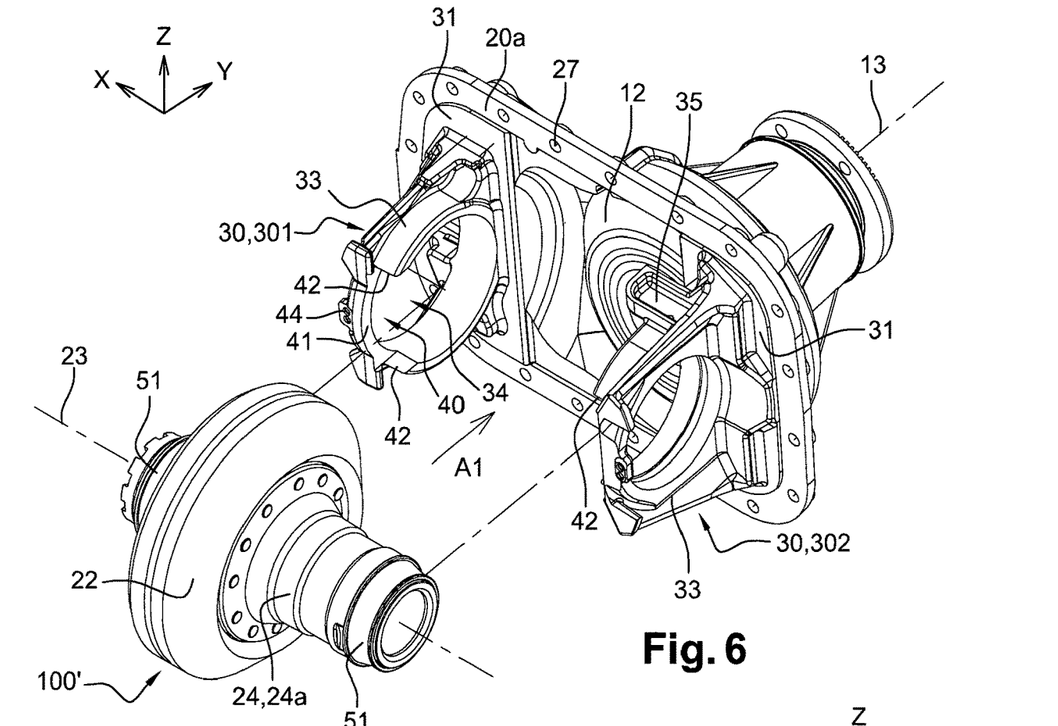

Thus, the system 100' provided with the bearing inner rings 51, but devoid of the bearing outer rings 52 (and preferably also devoid of the rolling elements 53 and cage 54) can be moved according to arrow A1 (see FIG. 6), along the transverse direction Y, so that the inner rings 51 pass through the notches 40, as illustrated in FIG. 6.

Figure 5:
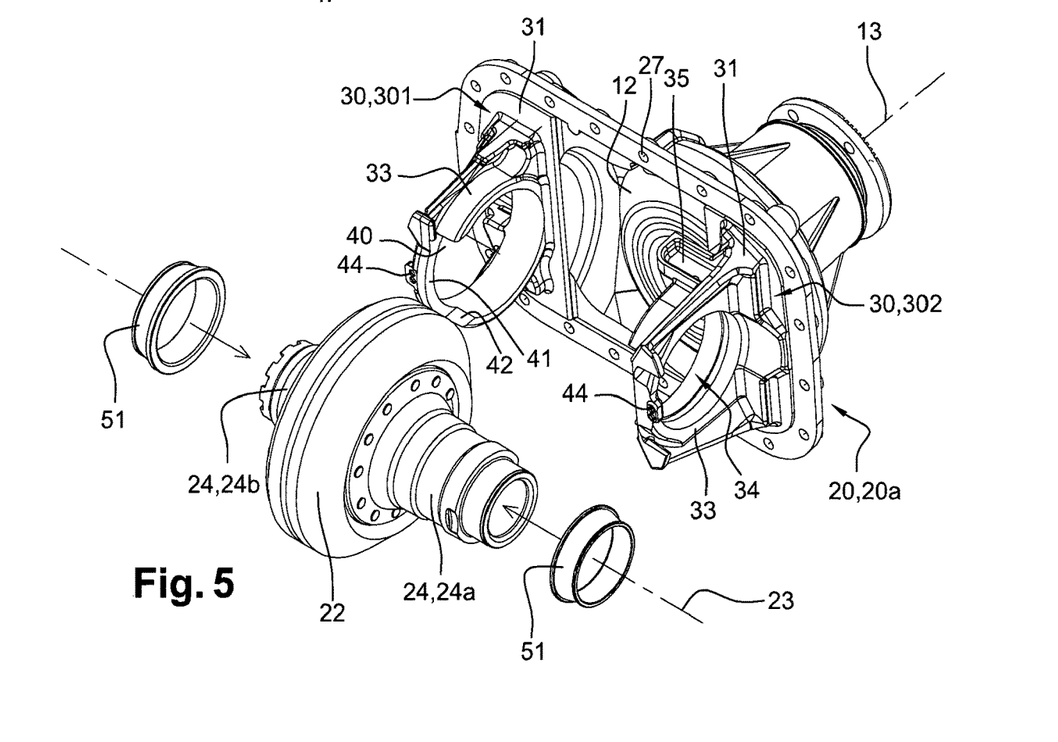
FIGS. 5 and 6 show steps of a method for mounting the differential unit according to the invention.

Before this mounting step and when the bearing inner ring 51 is a mounted part and not made as a single piece with a differential housing part 24a or 24b, a bearing inner ring 51 has been preliminarily mounted on each of the parts 24a, 24b of the differential housing 24, said parts 24a, 24b can be fastened on both sides of the crown wheel 22, as illustrated in FIG. 5.

Figure 7:
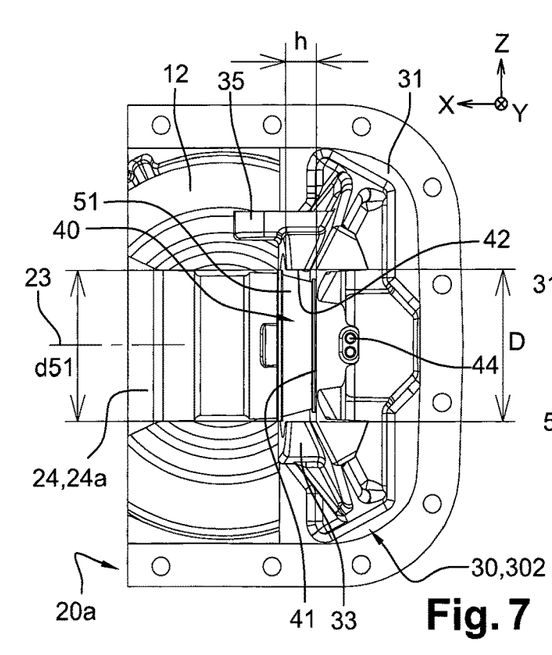
FIGS. 7 and 8 are detailed views of part of the differential unit, after the mounting step of FIG. 6.

As can be seen on FIGS. 4 and 7, given the distance between the supporting devices 301, 302, the height h of the notches 40—along the longitudinal direction X—is great enough to allow the differential housing 24 to be inserted between the bottom faces 41 of the notches 40.

Figure 9:
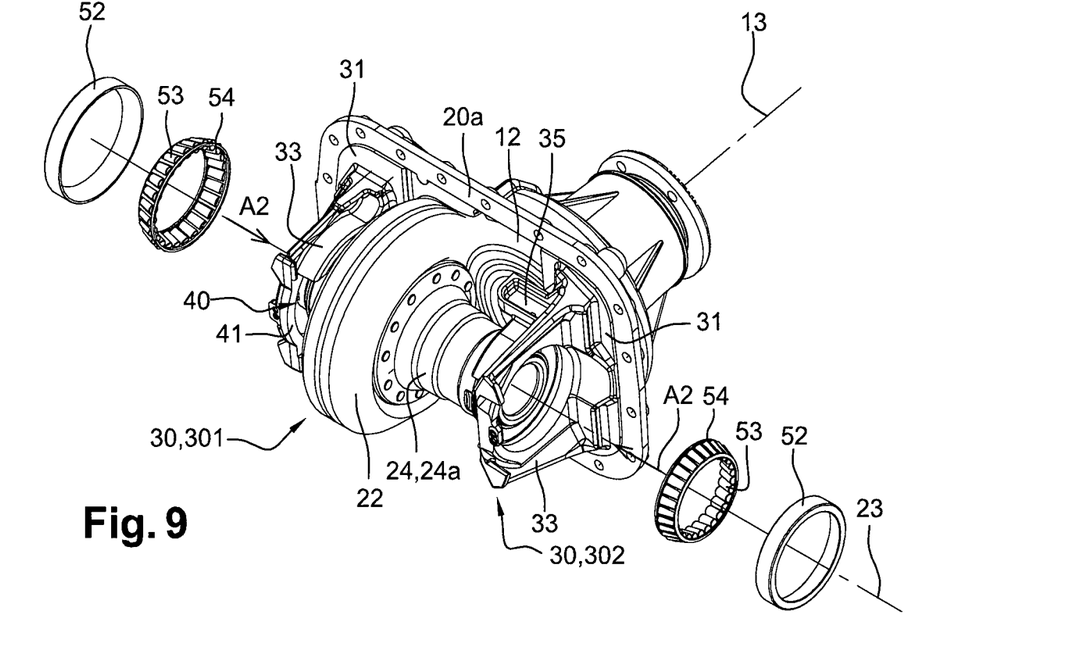
FIG. 9 shows a subsequent step of a method for mounting the differential unit according to the invention.

Subsequently, as shown on FIG. 9, each bearing outer ring 52 (as well as the rolling elements 53 and cage 54 if they were not mounted yet) is mounted around the corresponding bearing inner ring 51 by being inserted inside the ring-shaped main portion 33 of the corresponding supporting device 30. This is performed by a movement according to arrows A2, along the longitudinal direction X, towards the opposite supporting device 30.

Then, because D is less than d52, as explained above and as shown in FIG. 10, the whole system cannot move out of the notches 40, i.e. out of the supporting devices 30. With this implementation, the bearing outer rings 52 form a means at least partially closing the notches 40.

In a subsequent step of the mounting process, a nut 60 is preferably assembled on each end portion of the system, as shown on FIG. 11.

The nut 60 has an outer thread (not shown), for cooperating with an inner thread (not shown) of the ring-shaped main portion 33 of each supporting device 30, and a central hole 61 for engagement around the differential housing 24. Each nut 60 is assembled generally along the longitudinal direction X, while simultaneously being threaded, and towards the opposite supporting device 30.

In practice, after this step, the bearing 50 is arranged around the differential housing 24, the inner ring 51 resting against a radial shoulder 25 arranged on the differential housing 24, and facing opposite the differential 15. Moreover, the nut 60 is mounted in the circular opening 34 of the supporting device 30, on the side of the bearing 50 which is opposite the radial shoulder 25. The nut 60 is threaded with respect to the circular opening 34, i.e. rotated, so as to provide an appropriate preload—i.e. axial pressure—on the outer ring 52 of the bearing 50. In other words, the bearing 50 is pushed against the shoulder 25 by the nut 60.

At this stage, the system is properly mounted and locked in the operative position. Furthermore, the inter wheel differential bearing preload and the bevel set backlash have been adjusted. The nuts 60 can then be maintained in this position by means of appropriate fasteners 45 inserted through holes 44 of the supporting device 30.

The inner thread of the ring-shaped main portion 33, for cooperating with the nut 60, can only be made when the ring is actually formed. Because each supporting device 30 of the invention is made as a single piece, the process does not include:

- a preliminary step for mounting several parts to one another to form the ring-shaped main portion 33; and
- a pairing of parts to ensure that the parts which will be secured to one another to form the supporting device 30 were threaded together, to avoid malfunctioning of the differential unit 10.

Therefore, the invention provides an improved differential unit in terms of manufacturing and mounting process, reliability and robustness.

The differential unit 10 is then ready to be assembled to the axle housing 7.

Figure 12:
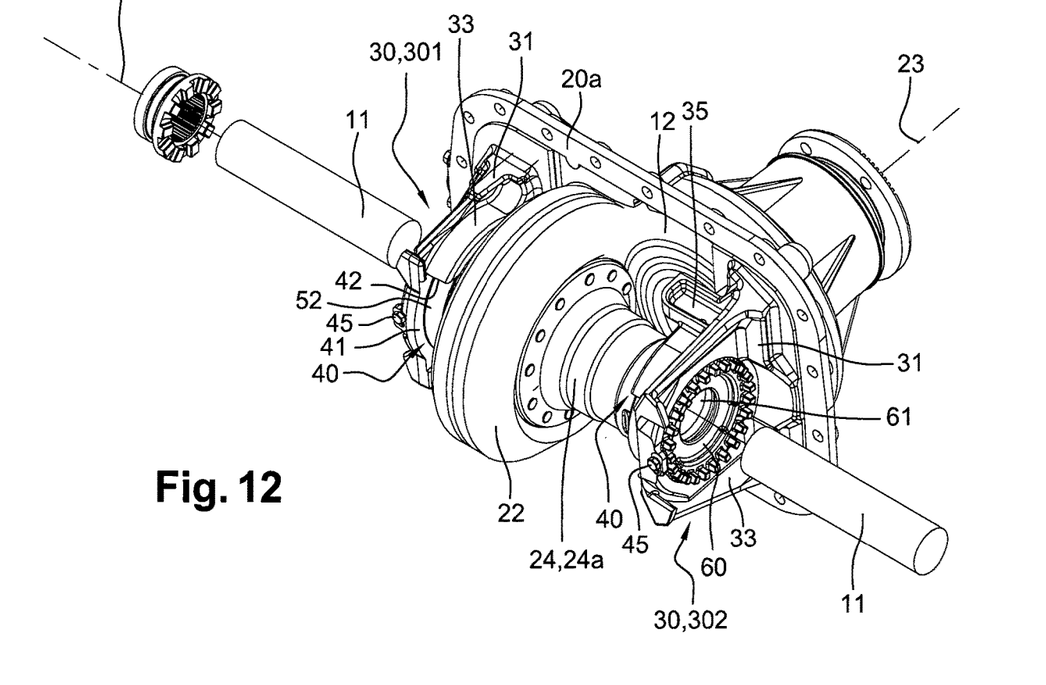

The method then comprises inserting an end portion of a drive shaft 11 in each part 24a, 24b of the differential housing 24, along the longitudinal direction X and towards the opposite supporting device 30, in order to form the rear axle 6 (see FIG. 12).

It is to be understood that the present invention is not limited to the embodiments described above and illustrated in the drawings; rather, the skilled person will recognize that many changes and modifications may be made within the scope of the appended claims.

For instances, on FIGS. 2 to 12 illustrating embodiments previously described, each supporting device comprises a notch 40. In a variant only one of the supporting device can be provided with a notch.

According to the latter variant, the system 100' provided with the bearing inner rings 51, but devoid of the bearing outer rings 52 (and preferably also devoid of the rolling elements 53 and cage 54) can be firstly moved along the transverse direction Y, so that a first end portion of the system 100' and the corresponding first inner ring 51 pass through the notch of a first supporting device 30 and then can be further moved along the longitudinal direction X towards the second supporting device 30 so that the second end portion of the systems 100' and the corresponding second inner ring 51 are introduced into the main portion of the second supporting device 30.

The invention claimed is:

1. An assembly for a differential unit of a vehicle, the assembly comprising:
   a first housing portion configured to be assembled with a second housing portion to form a differential carrier housing;
   first and a second supporting devices, each comprising a main portion having substantially the shape of a ring and a base portion attached to the first housing portion so that the main portions of the first and second supporting devices are substantially coaxial along a longitudinal direction, the first and second supporting devices being configured to support, a system comprising a crown wheel and a differential housing containing a differential, the system having two end portions each including a hearing which has an inner ring arranged around the differential housing, an outer ring configured to be mounted in the main portion of one of the first and second supporting devices, and rolling elements; and
   at least one cover assembled to at least one of the first or second supporting devices;
   wherein the first housing portion, the first supporting device, and the second supporting device are made as a single piece;
   wherein the main portion of the at least one of the first or second supporting devices comprises a notch for inserting at least part of a corresponding end portion of the system, the notch opening:
   in a radial direction, which is orthogonal to the longitudinal direction; and in the longitudinal direction, towards the other of the first or second supporting devices;

wherein the at least one cover is configured to at least partially close the notch to prevent disengagement of the system mounted in the at least one of the first or second supporting devices; and wherein said notch is dimensioned to prevent movement of the system out of the notches.

2. The assembly according to claim 1, wherein the notch forms a through hole in the radial direction and a non-through hole in the longitudinal direction.

3. The assembly according to claim 1, wherein the other of the first and second supporting devices comprises a notch for inserting at least part of the corresponding end portions of the system and the notches are substantially facing each other along the longitudinal direction.

4. The assembly according to claim 1, wherein said notch is arranged on said at least one of the first or second supporting devices substantially opposite the base portion with respect to a longitudinal axis.

5. The assembly according to claim 1, wherein said notch is dimensioned to allow mounting the system when it is devoid of the bearing outer rings, and in that the assembly is configured to prevent movement of the system out of said notch once the system has been mounted in the first or second supporting devices with outer rings.

6. A differential unit, comprising:
an assembly, comprising:
a first housing portion configured to be assembled with a second housing portion to form a differential carrier housing;
first and second supporting devices, each comprising a main portion having substantially the shape of a ring and a base portion attached to the first housing portion so that the main portions of the first and second supporting devices are substantially coaxial along a longitudinal direction; and
at least one cover assembled to at least one of the first or second supporting devices;
wherein the first housing portion, the first supporting device, and the second supporting device are made as a single piece, and
a system, comprising:
a differential comprising differential side pinions fitted on a joint cross of the differential and two differential side gears each connected to at least one differential side pinion and to a drive shaft capable of being connected to at least one wheel of a vehicle, outside the differential carrier housing;
a differential housing containing the differential and a part of the drive shafts;
a crown wheel having a longitudinal axis, the crown wheel being arranged to be driven in rotation around said longitudinal axis by an input shaft, the crown Wheel being connected to the joint cross of the differential in a rotationally fixed manner, the crown wheel being secured to the differential housing and the crown Wheel being arranged substantially around the differential housing; and
at end portions on both sides of the crown wheel, a bearing having an inner ring arranged around the differential housing, rolling elements, and an outer ring mounted in the ring-shaped main portion of the corresponding supporting device;
wherein the first and second supporting devices of the assembly are configured to support the system;

wherein the main portion of at least one supporting device of the first and second supporting devices comprises a notch for inserting at least part of a corresponding end portion of the system, the notch opening:
in a radial direction, which is orthogonal to the longitudinal direction; and
in the longitudinal direction, towards the other of the first and second supporting devices;
wherein the at least one cover is configured to at least partially close the notch to prevent disengagement of the system mounted in the supporting devices; and
wherein said notch defines an opening on the ring-shaped main portion of the corresponding supporting device, the width of said opening being less than an outer diameter of the bearing outer ring.

7. The assembly according to claim 6, wherein said notch defines an opening on the ring-shaped main portion of the corresponding supporting device, the width of said opening being greater than an outer diameter of the bearing inner ring.

8. The differential it according to claim 6, further comprising an axle wherein it comprises the differential unit, the axle comprising an axle housing which forms the second housing portion configured to be assembled to the first housing portion and which contains the drive shafts, the axle further comprising at least one Wheel connected to one end of each drive shaft.

9. The differential unit according to claim 8, wherein the vehicle comprises at least one axle.

10. A method for mounting a differential unit, the method comprising:
a) providing an assembly comprising:
a first housing portion configured to be assembled with a second housing portion to form a differential carrier housing;
first and second supporting devices, each comprising a main portion having substantially the shape of a ring and a base portion attached to the first housing portion so that the main portions of the first and second supporting devices are substantially coaxial along a longitudinal direction; and
at least one cover assembled to at least one of the first or second supporting devices;
wherein the first housing portion, the first supporting device, and the second supporting device are made as a single piece;
b) providing a system comprising:
a crown wheel; and
a differential housing containing a differential, the system having two end portions each including a bearing which has an inner ring arranged around the differential housing, an outer ring, and rolling elements;
wherein the first and second supporting devices are configured to support the system; and
c) inserting at least part of at least one end portion of the system through a notch in the main portion of at least one of the first or second supporting devices, along said radial direction, in order to mount the system on the assembly, the system mounting devoid of the bearing outer rings on the assembly, the notch opening:
in a radial direction, which is orthogonal to the longitudinal direction; and
in the longitudinal direction, towards the other of the first and second supporting devices; and d) at least partially closing the notch with the at least one cover to prevent disengagement of the system mounted in the supporting devices.

11. The method according to claim 10, wherein:

in step a) the other of the first and second supporting devices comprises a notch for inserting at least part of the corresponding end portions of the system and the notches are substantially facing each other along the longitudinal direction; and in step c) at least part of each end portion of the system is inserted through the notch of each of the first and second supporting devices, along said radial direction, in order to mount the system on the assembly.

12. The method according to claim 10 wherein, once the system devoid of the bearing outer rings is mounted on the assembly, the method comprises inserting each bearing outer ring around the corresponding bearing inner ring and inside the ring-shaped main portion of the corresponding supporting device, along the longitudinal direction, towards the other of the first and second supporting devices.

13. The method according to claim 10, further comprising closing the notch, after step c).

14. The method according to claim 10, further comprising assembling, once the system is mounted on the assembly, a nut on each end portion of the system, generally along the longitudinal direction and towards the other of the first and second supporting devices, the nut having an outer thread for cooperating with an inner thread of the ring-shaped main portion of each supporting device of the first and second supporting devices, and a central hole for engagement around the differential housing.

15. The method according to claim 14, further comprising inserting, once the nuts are mounted, an end portion of a drive shaft in the differential housing, along the longitudinal direction and towards the other of the first and second supporting devices.

* * * * *